(12) United States Patent
Bartley (10) Patent No.: US 7,191,337 B2
(45) Date of Patent: Mar. 13, 2007

(54) APPARATUS FOR WILDCARDED SECURITY POLICY AND METHOD THEREFOR

(75) Inventor: Timothy Simon Bartley, WestBurleigh (AU)

(73) Assignee: International Business Machines Corporation, Armonk, NY (US)

( * ) Notice: Subject to any disclaimer, the term of this patent is extended or adjusted under 35 U.S.C. 154(b) by 1198 days.

(21) Appl. No.: 09/896,200

(22) Filed: Jun. 30, 2001

(65) Prior Publication Data

US 2003/0005307 A1 Jan. 2, 2003

(51) Int. Cl.
G06F 17/00 (2006.01)
(52) U.S. Cl. .................. 713/182; 713/168; 713/170
(58) Field of Classification Search ............... 713/182, 713/168, 170
See application file for complete search history.

(56) References Cited

U.S. PATENT DOCUMENTS

| | | | |
|---|---|---|---|
| 5,442,780 A | 8/1995 | Takanashi et al. | 395/600 |
| 5,892,904 A | 4/1999 | Atkinson et al. | 395/187.01 |
| 6,012,094 A | 1/2000 | Leymann et al. | 709/230 |
| 6,088,801 A | 7/2000 | Grecsek | 713/200 |
| 6,108,676 A | 8/2000 | Nakatsuyama | 707/522 |
| 6,138,238 A | 10/2000 | Scheifler et al. | 713/200 |
| 6,158,010 A | 12/2000 | Moriconi et al. | 713/201 |
| 6,170,012 B1 | 1/2001 | Coss et al. | 709/229 |

OTHER PUBLICATIONS

Pinker and Wear, Operating Systems, Concepts, Policies, and Mechanisms, Prentice Hall, 1989, pp. 4, 205-207.* http://www.eli.sdsu.edu/courses/spring99/cs696/notes/rmiIntro/rmiIntro.html.* http://livedocs.macromedia.com/jrun/4/JRun_Service_Pack_1_Guide/jndisecurity4.htm.* http://www.eli.sdsu.edu/courses/spring99/cs696/notes/security/security.html.*

Partial identification of Lorenz system and its application to key space reduction of chaotic cryptosystems; Solak, E.; Circuits and Systems II: Express Briefs, IEEE Transactions on; vol. 51, Issue 10, Oct. 2004 pp. 557-560.*

Verifiable identifiers in middleware security; Lang, U.; Gollmann, D.; Schreiner, R.; Computer Security Applications Conference, 2001. ACSAC 2001. Proceedings 17th Annual Dec. 10-14, 2001 pp. 450-459.*

Real-time interception systems for the GSM protocol; Gonzalez-Castano, et al.; Vehicular Technology, IEEE Transactions on vol. 51, Issue 5, Sep. 2002 pp. 904-914.*

IBM Technical Disclosure Bulletin, (vol. 38, No. 09) Sep. 1995, "Partial Containment Structure for Inegration of Distributed Computing Environment and Local Registries," pp. 535-538.

* cited by examiner

*Primary Examiner*—David Jung
(74) *Attorney, Agent, or Firm*—Duke W. Yee; Jeffrey S. LaBaw; Gerald H. Glanzman (57) ABSTRACT

An apparatus and method for wildcarded security policy are implemented. These include associating wildcarded resource identifiers with a corresponding security policy. A resource identifier received in an access request is matched to one of a list of said wildcarded resource identifiers. Matching is determined in accordance with a predetermined set of precedence values, each precedence value of the set corresponding to a predetermined wildcard element.

28 Claims, 6 Drawing Sheets

| PRECEDENCE | WILDCARD ELEMENT |
|---|---|
| 1 | EXACT CHARACTER |
| 2 | CHARACTER RANGE |
| 3 | ANY CHARACTER |
| 4 | REPEATING EXACT CHARACTER |
| 5 | REPEATING CHARACTER RANGE |
| 6 | ANY CHARACTER STRING |

APPARATUS FOR WILDCARDED SECURITY POLICY AND METHOD THEREFOR

TECHNICAL FIELD

The present invention relates in general to data processing systems, and in particular to security policies associated with protected resources in a data processing system in which regular expressions are used to represent the name of a set of protected resources and determining which policy to apply to an actual resource where the descriptor of the actual resources matches multiple regular expressions.

BACKGROUND INFORMATION

Figure 1:
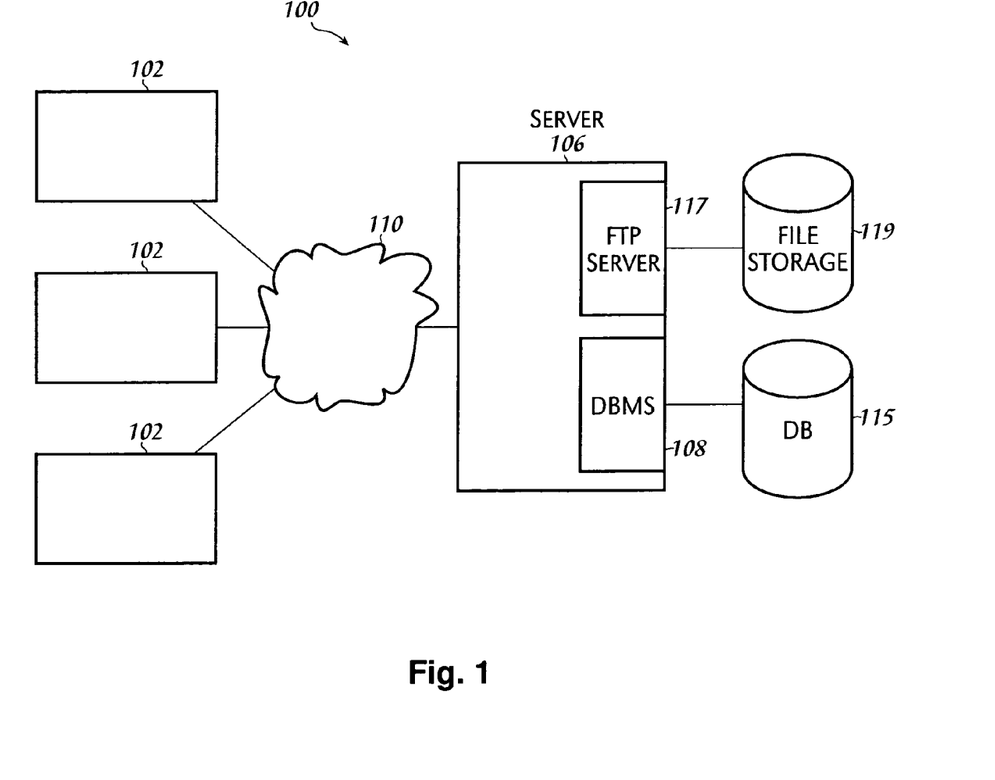
FIG. 1 illustrates, in block diagram form, a simplimultiuser environment which may be used in conjunction with the present invention.

Modem data processing systems, particularly in a multiuser environment, employ access control measures to or otherwise manage access to resources available to the users of the system. These control measures may manage data access, event routing, and task authorization, for example. The set of rules that determine which users, or possibly groups of users, can access a particular resource with respect to these activities may often be referred to as "policies." For example, referring to FIG. 1, there is shown therein an illustrative a multiuser system 100 in which a plurality of clients 102 are connected to a server 106 via network 110. Network 110 may be a local area network (LAN), wide area network (WAN) or the Internet, for example. It would be appreciated that the principles of the present invention to be discussed hereinbelow are not predicated on a particular network architecture. Server 106 may provide, for example, application services, exemplified by database management system (DBMS)108 and database (DB) 115 to clients 102, and data access, exemplified by FTP server 117 and file storage 119. (An artisan of ordinary skill would recognize that an FTP server is an application that enables users to download or upload files from a specified directory or group of directories using the F(ile) T(ransfer) P(rotocol), an Internet standard for the exchange of files.)

Typically, a policy may be associated with each resource identifier. For example, a file on a FTP server may be a resource that is available to users in accordance with a particular policy. In other words, the file may be accessible only to a limited class of users, such as, users who are registered licensees of a software product, for example. Thus, a file with a filename filename 1 in a directory named foo and a subdirectory of foo named bar would be identified by the pathname foo\bar\filename 1. In general, subdirectory bar may contain n files say filename 1, filename 2, . . . , filename n. Associated with each of these files may be a policy for managing user access to these files. However, subsets of files filename 1, filename 2, . . . , filename n may have the same policy. Similarly, with respect to system resources, generally, subsets, or classes, of resources, each of which is uniquely identified, may never-the-less, have the same policy associated therewith. Nevertheless, each resource is associated with a policy even though the policies may be the same for a multiplicity of the resources. Thus, there is a need in the art for a mechanism by which a multiplicity, or set, of resources in a data processing system may be associated with a common policy.

SUMMARY OF THE INVENTION

The aforementioned needs are addressed by the present invention. Accordingly there is provided a wildcarded security policy method. The method includes associating wildcarded resource identifiers with a corresponding security policy. A resource identifier received in an access request is matched to one of a list of said wildcarded resource identifiers. Matching is determined in accordance with a predetermined set of precedence values, each precedence value of the set corresponding to a predetermined wildcard element.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. For example, file, and other descriptors, may be identified by particular character strings, however, it would be recognized by those of ordinary skill in the art that the present invention may be practiced without such specific details. In other instances, well-known circuits have been shown in block diagram form in order not to obscure the present invention in unnecessary detail.

Figure 2:
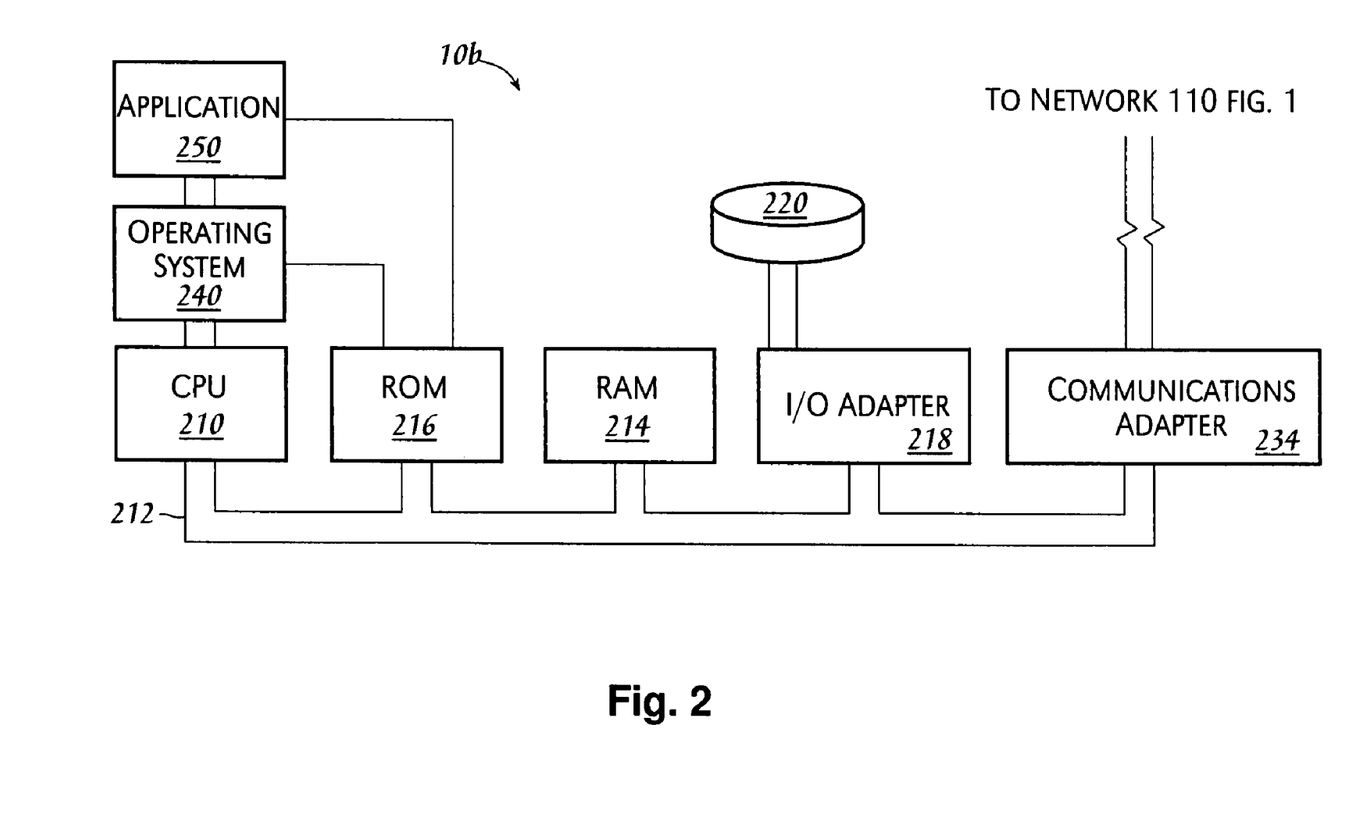
FIG. 2 illustrates, in block diagram form, a data processing system in accordance with an embodiment of the present invention.

Refer now to FIG. 2 which illustrates a Server 106 in accordance with the principles of the present invention, in further detail. Server 106 may include a central processing unit (CPU) 210 coupled to various other components by system bus 212. An operating system 240 runs on CPU 210 and provides control and coordinates the function of the various components in FIG. 2. Application 250 includes widcarded policies in accordance with the principles of the present invention and which will be described further in conjunction further with FIGS. 3–6 hereinbelow. Application 250 runs in conjunction with operating system 240, which coordinates the internal functions of Server 106, as would be understood by those of ordinary skill in the art. Additionally, read only memory (ROM) 216 is coupled to system bus 212 and includes a basic input/output system (BIOS) that control certain basic functions of server 106. Random access memory (RAM) 214, disk adapter 218 and communications adapter 234 are also coupled to system bus 212. It should be noted that software components including operating system 240 and application 250 are loaded into RAM 214 which is the computer systems main memory.

Disk adapter 218 maybe a Universal Serial Bus (USB) or other adapter that communicates with disk units 220. It is noted that the program of the present invention may reside in disk unit 220 and loaded into RAM 214 by operating system 240, as required. Communications adapter 234 interconnect bus 212 with a network, such as network 110, FIG. 1.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. And to require by Server 106, the set of instructions may be stored as a computer program product in another computer memory, for example in disk drive 220 (which may include a removable memory such as an optical disk or floppy disk for eventual use in disk drive 220). Furthermore, the computer program product can also be stored in another computer and transmitted when desired to the work station by a network or by an external network such as the Internet. One skilled in the art would appreciate that the physical storage of the sets of instructions physically changes the medium upon which it is stored so that the medium carries computerable information. The change may be electrical, magnetic, chemical or some other physical change.

Figure 3:
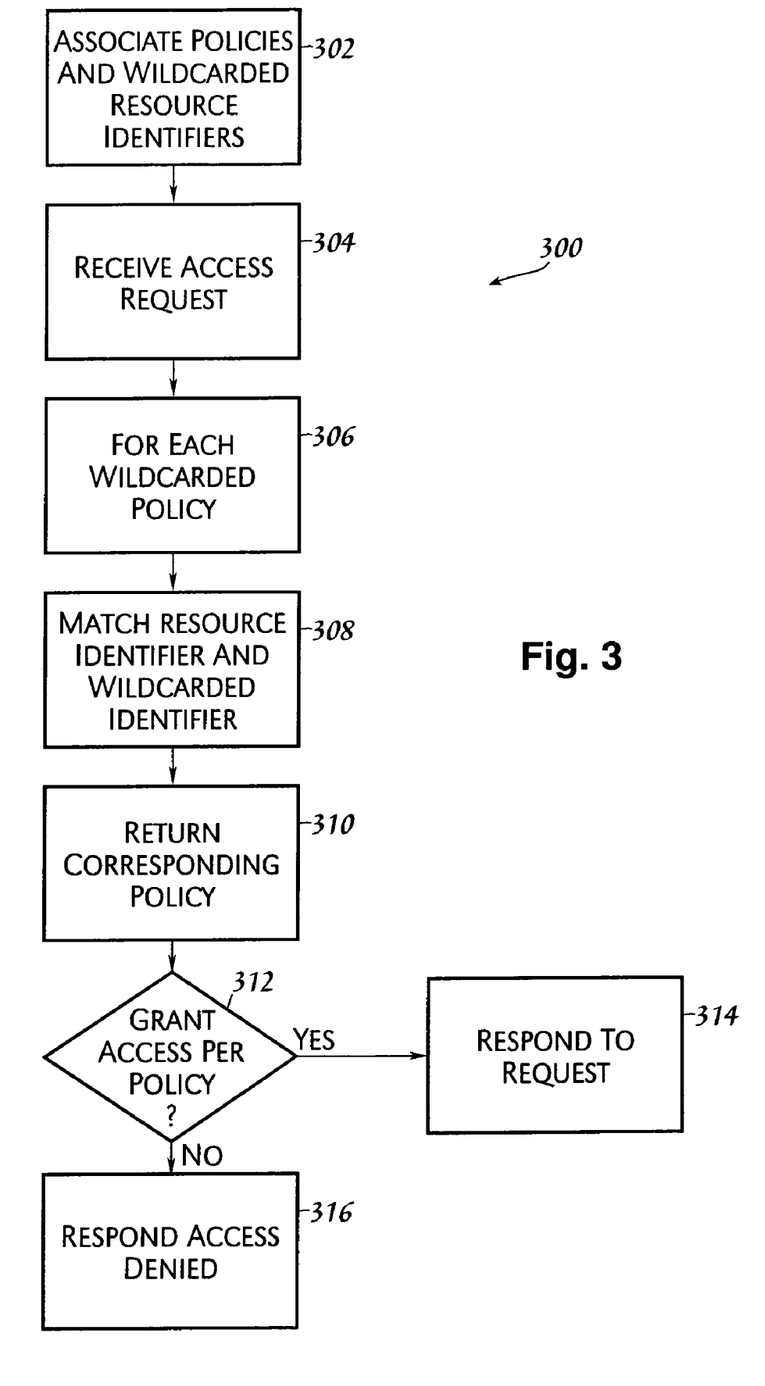
FIG. 3 illustrates, in flow chart form, a methodology in accordance with an embodiment of the present invention.

Refer now to FIG. 3 illustrating a flow chart of methodology 300 for access control using policies associated with sets of resources. Typically, resources are identified by a name, which constitutes an alphanumeric character stream. In an embodiment of the present invention, the association of a set of resources having a common security policy may be made by the use of an identifier that constitutes alphanumeric characters as well as special characters, in particular, regular expressions. In an embodiment of the present invention, regular expressions may be a pattern or stream as used in the Unix operating system (OS) specification. (Persons of ordinary skill in the art would recognize Unix as a multi-tasking operating system available on a wide range of platforms.) Identifiers including regular expressions may be referred to herein as "wildcarded" resource identifiers, or simply, wildcarded identifiers.

In step 302, policies corresponding to sets of resources are associated with the corresponding wildcarded resource identifiers. In step 304, an access request is received from, for example a client such as one of clients 102, FIG. 1. The access request may be received by a server, for example Server 106, including software which performs one or more of the steps of methodology 300. In the access request received in 304, is a resource identifier. In steps 306–316, methodology 300 determines a grant or denial of access in accordance with the policies based on a match between the resource identifier received in the request and the wildcarded resource identifiers associated with the policies in accordance with step 302.

For each wildcarded policy, that is a policy associated with a wildcarded identifier step 306, in step 308, the resource identifier received in the request and the wildcarded identifiers are matched. Matching of resource identifiers with wildcarded identifiers will be discussed further in conjunction with FIG. 4.

In step 310, the corresponding policy is retrieved, and in step 312 a determination is made, based on the policy, to grant or deny access. The request received in step 304 includes an identifier for the user making the request, and the user identifier may be compared with the retrieved policy. If the user making the request is authorized in accordance with the policy to make the request, the request is responded to in step 314. Otherwise, the user making the request is unauthorized, and access is denied, step 316.

Figure 4:
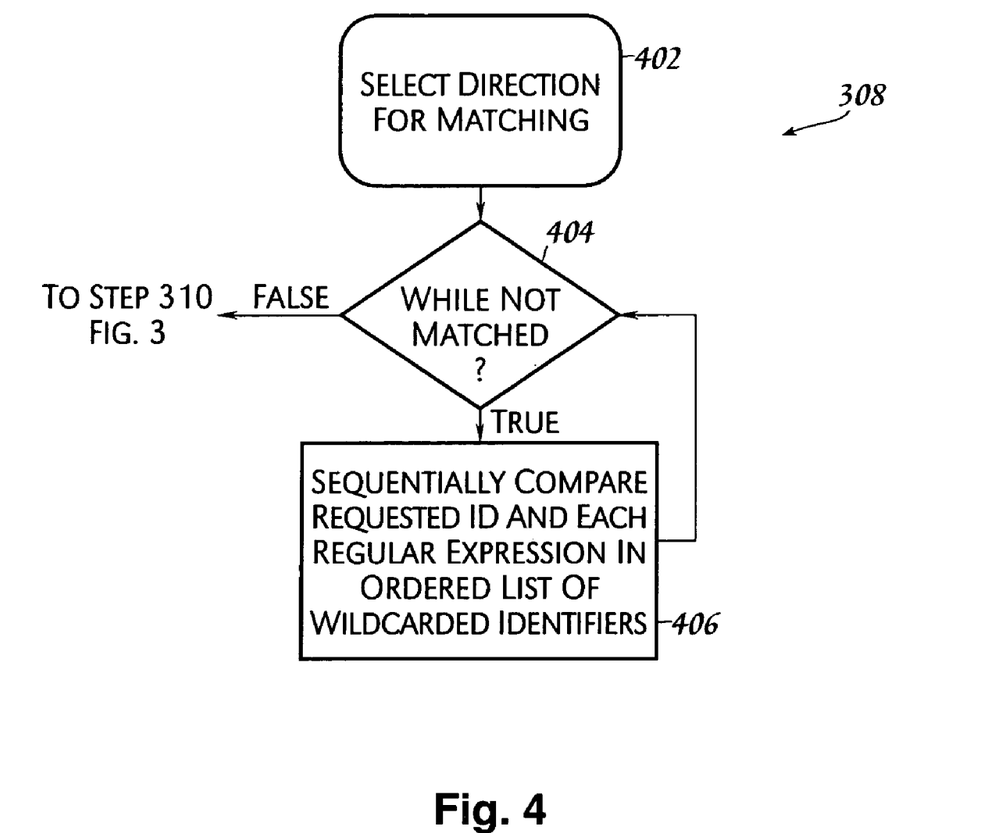
FIG. 4 illustrates, in further detail, a portion of the methodology of FIG. 3.

Refer now to FIG. 4 illustrating step 308 of FIG. 3 in further detail. In step 402, a direction for matching is selected. Note that the specificity for matching a wildcarded identifier and the received resource identifier depends on the type of resource, and its concomitant identifier format. For example, a pathname to a file resource is measured from right to left. Thus, a wildcarded identifier for a file, that is, a wildcarded pathname such as /File/usr/local/test/foo* is more specific than a wildcarded pathname /File/usr/local/test/f*. Conversely, a wildcarded identifier for an Internet host, that is a wildcarded hostname, have specificity measured from left to right. Thus, for example, a wildcarded hostname *.ibm.com is considered more specific than *.com, and a wildcarded hostname foo.*.ibm.com may be taken to be more specific than a wildcarded hostname foo.bar.*.com.

In step 404, a loop over wildcarded identifiers for the particular resource being accessed is performed. The resource identifier in the request received in step 304, FIG. 3, is matched against each wildcarded identifier in a list, ordered by a predetermined set of precedence rules. (Ordering of wildcarded identifiers will be discussed in conjunction with FIG. 5 herein below.) In step 404, while a match has not been obtained, the identifier (ID) of the resource requested is compared with each regular expression in the ordered list. Note that, as would be recognized by those of ordinary skill in the art, that matching algorithms for matching regular expressions are known in the art, particularly, with respect to utilities available in the Unix OS. The ordered list of wildcarded identifiers maybe ordered in accordance with a predetermined precedence, as will be discussed hereinbelow, whereby conflicts between matches between more than one wildcarded identifier and the requested resource identifier are resolved. In matching against the ordered list of wildcarded identifiers in which the list is ordered from highest to lowest precedence, the policy associated with the wildcarded identifier having the highest precedence is returned with the first match found. When a match is found, step 404 proceeds by the "False" branch to step 310, FIG. 3.

Figure 5:
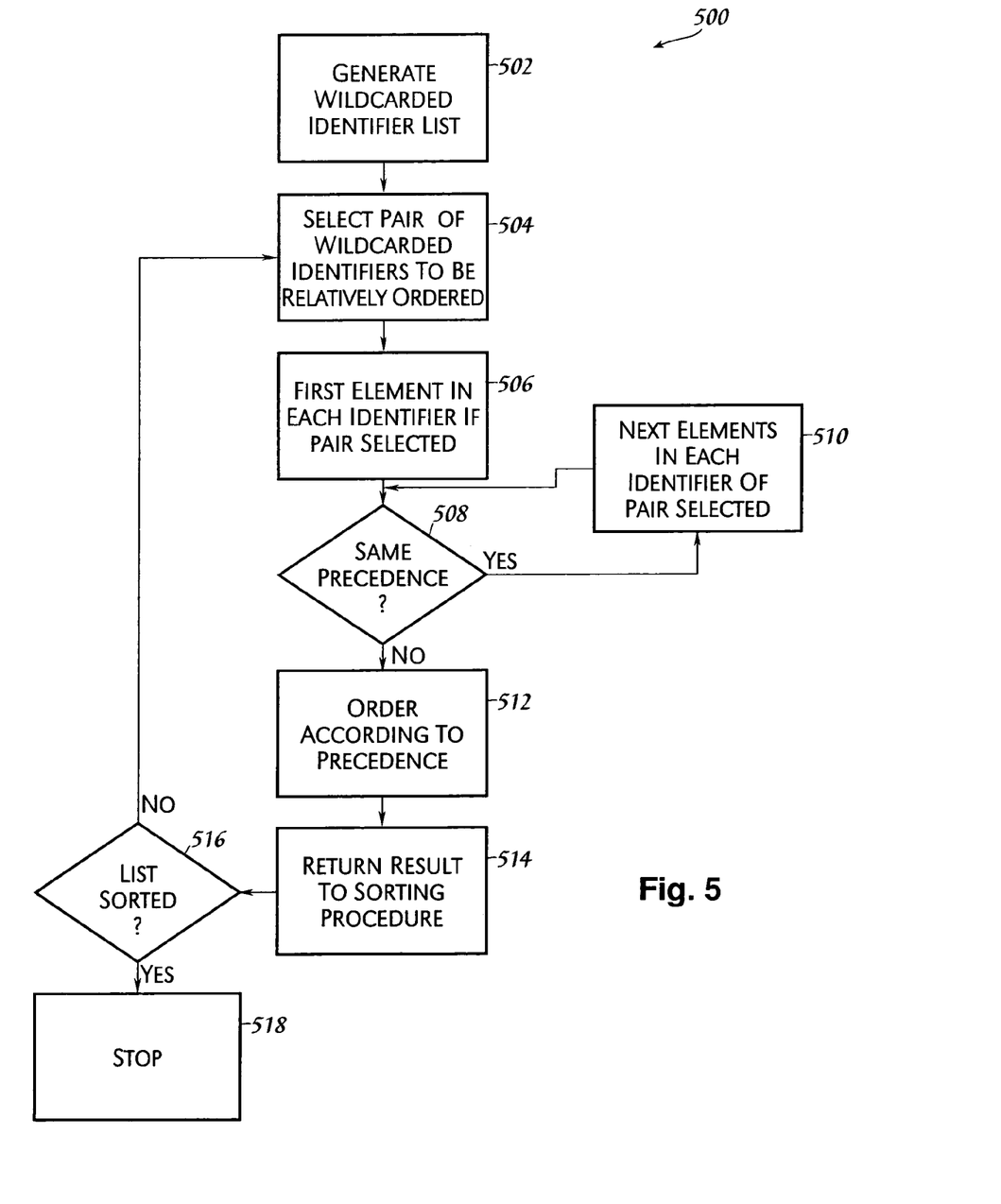
FIG. 5 illustrates, in flow chart form, a sorting methodology which may be used in conjunction with the methodology of FIG. 3.

Refer now to FIG. 5 illustrating methodology 500 for generating an ordered list of wildcarded identifiers. In step 502, a wildcarded identifier list is generated. An ordered list of wildcarded identifiers may be generated in accordance with the principles of the present invention by steps 504–518 in conjunction with a sorting routine such as are known in the data processing art. One such routine is known as a Heapsort. See e.g. WILLIAM H. PRESS ET AL., NUMERICAL RECIPES 229–232 (1986). Other sorting routines, known in the art, which may be used are insertion techniques. See id. 227–229. In each of these, a pairwise ordering of wildcarded indentifiers are relatively ordered, thus, in step 504, a pair of wildcarded identifiers to be relatively ordered is selected in accordance with the particular sorting algorithm being used. The relative ordering is then established in accordance with steps 506–514.

Figure 6:
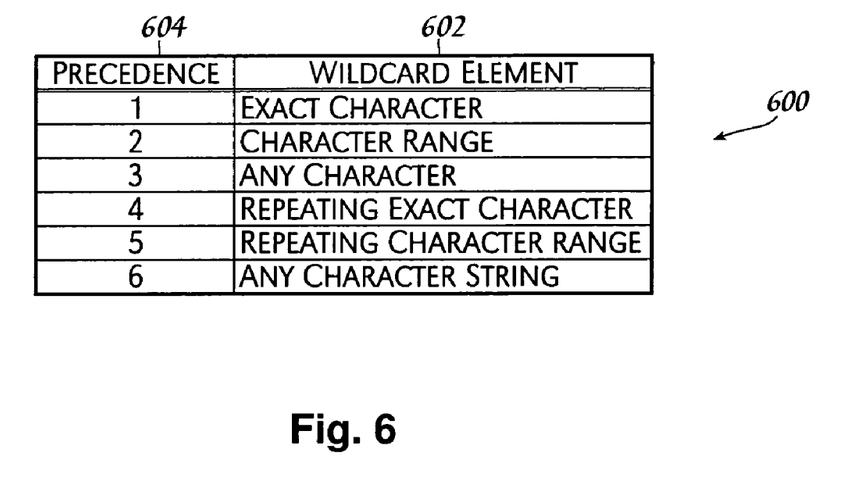
FIG. 6 illustrates a precedence table which may be used in conjunction with the methodology of FIG. 5.

In step 506, the first element in each identifier of the pair selected in step 504 are selected. The first element of each identifier of the pair is selected in accordance with the direction for matching selected in step 402, FIG. 4. In step 508, it is determined if the elements selected have the same precedence. The precedence is determined in accordance with a precedence table. A precedence table which may be used in an embodiment of the present invention is shown in FIG 6. Wildcard elements are listed in decreasing precedence in column 604 of table 600. (For the purpose herein, a "character range" refers to some finite set of characters. When matching a resource string if a character, when being matched against a corresponding character range element in the wildcarded identifier, a match is said to occur if the character in the resource string is contained in the set of characters represented by the character range. Additionally, any wildcarded identifier element may be marked as repeating in which case the element will match one or more occurrences of matching characters in the resource identifier.) A precedence value is associated with each type of wildcard element, as shown in column 602 of table 600. Note that lower numerical precedence values are associated wit higher precedence, and conversely higher numerical precedence value are associated with elements having lower precedence in the embodiment of the present invention corresponding to table 600. However, an embodiment of the present invention in which higher numerical precedence are associated with wildcard elements having higher precedence could be used, and such embodiments fall within the spirit and scope of the present invention. (These alternative embodiments would correspond to, for example, in the ordering algorithm being used to correspond with a binary relationship "greater than" between pairwise elements, and a binary relationship "less than" between element pairs, respectively.)

Returning to FIG. 5, if, in step 508, the element pairs being compared have the same precedence, then in step 510 the next elements in each identifier of the pair are selected and compared by returning to step 508. In other words, process 500 loop through elements of each identifier pair until a mismatch in precedence is found.

On finding a mismatch, one element of the pair necessarily has a higher precedence than the other, and in step 512 are ordered in accordance with their precedence. In step 514 the result is returned to the sorting procedure being used, for example, Heapsort, as discussed hereinabove. Process 500 then loops in accordance with the sorting procedure being used, by returning to step 504, until in step 516 the list is sorted. In step 518, process 500 terminates on completion of the sort.

The sorted list of wildcarded identifiers may then be used in conjunction with the methodology of FIG. 3.

Although the present invention and its advantages have been described in detail, it should be understood that various changes, substitutions and alterations can be made herein without departing from the spirit and scope of the invention as defined by the appended claims.

What is claimed is:

1. A security policy method comprising the steps of:
    associating wildcarded resource identifiers with a corresponding security policy; and
    matching a resource identifier received in an access request to one of a list of said wildcarded resource identifiers, wherein said matching is determined in accordance with a predetermined set of precedence values, each precedence value of said predetermined set of precedence values corresponding to a predetermined wildcard element.

2. The method of claim 1 wherein each predetermined wildcard element comprises a regular expression element.

3. The method of claim 1 further comprising the step of selecting, in response to a security policy associated with a wildcarded resource identifier from said matching step, one of a grant of access to a requested resource corresponding to said resource identifier and a denial of access to said requested resource.

4. The method of claim 1 wherein said list of said wildcarded resource identifiers comprises an ordered list of wildcarded resource identifiers, said ordered list being ordered in accordance with said predetermined set of precedence values.

5. The method of claim 4 wherein said step of matching said resource identifier received in said access request comprises the steps of:
    sequentially comparing said resource identifier received in said access request with each wildcarded resource identifier in said ordered list; and
    in response to a comparison, terminating said comparing step, and returning a policy associated with a wildcarded resource identifier from said comparing step.

6. The method of claim 4 further comprising the step of ordering said ordered list of wildcarded resource identifiers.

7. The method of claim 6 wherein said step of ordering said ordered list of wildcarded resource identifiers includes the steps of:
    selecting a pair of wildcarded resource identifiers in accordance with a predetermined sorting process;
    sequentially selecting elements in each identifier of said pair of wildcarded resource identifiers;
    comparing a first precedence value corresponding to a first one of a selected element of said pair of wildcarded resource identifiers and a second precedence value corresponding to a second one of a selected element of said pair of wildcarded resource identifiers, wherein said first precedence value and said second precedence value each comprise a predetermined value from said predetermined set of precedence values; and
    if said first precedence value and said second precedence value are not equal, ordering said pair of wildcarded resource identifiers according to said first precedence value and said second precedence value.

8. The method of claim 7 further comprising the step of returning said pair of wildcarded resource identifiers from said ordering step to said predetermined sorting process.

9. The method of claim 1 wherein said predetermined set of precedence values comprises:
    a first precedence value having a highest precedence corresponding to an exact character, a second precedence value having a next lower precedence from said first precedence value, corresponding to a character range;
    a third precedence value, having a next lower precedence from said second precedence value, corresponding to any character;
    a fourth precedence value, having a next lower precedence from said third precedence value, corresponding to a repeating exact character;
    a fifth precedence value, having a next lower precedence from said fourth precedence value, corresponding to a repeating character range; and
    a sixth precedence value, having a next lower precedence from said fifth precedence value, corresponding to any character string, and wherein said sixth precedence value comprises a lowest precedence value.

10. A security policy system comprising:
    circuitry operable for associating wildcarded resource identifiers with a corresponding security policy; and
    circuitry operable for associating wildcarded resource identifiers with a corresponding security policy matching a resource identifier received in an access request to one of a list of said wildcarded resource identifiers, wherein said matching is determined in accordance with a predetermined set of precedence values, each precedence value of said predetermined set of precedence values corresponding to a predetermined wildcard element.

11. The system of claim 10 wherein each predetermined wildcard element comprises a regular expression element.

12. The system of claim 10 further comprising circuitry operable far selecting, in response to a security policy associated with a wildcarded resource identifier from said matching step, one of a grant of access to a requested resource corresponding to said resource identifier and a denial of access to said requested resource.

13. The system of claim 10 wherein said list of said wildcarded resource identifiers comprises an ordered list of wildcarded resource identifiers, said ordered list being ordered in accordance with said predetermined set of precedence values.

14. The system of claim 13 wherein said circuitry operable for matching said resource identifier received in said access request comprises:
circuitry operable for sequentially comparing said resource identifier received in said access request with each wildcarded resource identifier in said ordered list; and
circuitry operable for, in response to a comparison, terminating said comparing step, and returning a policy associated with a wildcarded resource identifier from said comparing step.

15. The system of claim 13 further comprising circuitry operable far ordering said ordered list of wildcarded resource identifiers.

16. The system of claim 15 wherein said circuitry operable for ordering said ordered list of wildcarded resource identifiers includes:
circuitry operable for selecting a pair of wildcarded resource identifiers from a list in accordance with a predetermined sorting process;
circuitry operable for sequentially selecting elements in each identifier of said pair of wildcarded resource identifiers;
circuitry operable for comparing a first precedence value corresponding to a first one of a selected element of said pair of wildcarded resource identifiers and a second precedence value corresponding to a second one of a selected element of said pair of wildcarded resource identifiers, wherein said first precedence value and said second precedence value each comprise a predetermined value from, said predetermined set of precedence values; and
circuitry operable for, if said first precedence value and said second precedence value are not equal, ordering said pair of wildcarded resource identifiers according to said first precedence value and said second precedence value.

17. The system of claim 16 further comprising circuitry operable for returning said pair of wildcarded resource identifiers from said ordering step to said predetermined sorting process.

18. The system of claim 10 wherein said predetermined set of precedence values comprises:
a first precedence value having a highest precedence corresponding to an exact character, a second precedence value have a next lower precedence from said first precedence value, corresponding to a character range;
a third precedence value, having a next lower precedence from said second precedence value, corresponding to any character;
a fourth precedence value, having a next lower precedence from said third precedence value, corresponding to a repeating exact character;
a fifth precedence value, having a next lower precedence from said fourth precedence value, corresponding to a repeating character range; and
a sixth precedence value, having a next lower precedence from said fifth precedence value, corresponding to any character string, and wherein said sixth precedence value comprises a lowest precedence value.

19. A computer program product in a machine readable medium of expression including programming for wildcarding security policies comprising programming instructions for performing the steps of:
associating wildcarded resource identifiers with a corresponding security policy; and
matching a resource identifier received in an access request to one of a list of said wildcarded resource identifiers, wherein said matching is determined in accordance with a predetermined set of precedence values, each precedence value of said predetermined set of precedence values corresponding to a predetermined wildcard element.

20. The program product of claim 19 wherein each predetermined wildcard element comprises a regular expression element.

21. The method of claim 19 further comprising programming instructions for performing the step of selecting, in response to a security policy associated with a wildcarded resource identifier from said matching step, one of a grant of access to a requested resource corresponding to said resource identifier and a denial of access to said requested resource.

22. The program product of claim 19 wherein said list of said wildcarded resource identifiers comprises an ordered list of wildcarded resource identifiers, said ordered list being ordered in accordance with said predetermined set of precedence values.

23. The program product of claim 22 wherein said program of instructions for performing the step of matching said resource identifier received in said access request comprises a program of instructions for performing the steps of:
sequentially comparing said resource identifier received in said access request with each wildcarded resource identifier in said ordered list; and
in response to a comparison, terminating said comparing step, and returning a policy associated with a wildcarded resource identifier from said comparing step.

24. The program product of claim 22 further comprising programming instructions for performing the step of ordering said ordered list of wildcarded resource identifiers.

25. The program product of claim 24 wherein said programming instructions for performing the step of ordering said ordered list of wildcarded resource identifiers includes programming instructions for performing the steps of:
selecting a pair of wildcarded resource identifiers from a list in accordance with a predetermined sorting process;
sequentially selecting elements in each identifier of said pair of wildcarded resource identifiers;
comparing a first precedence value corresponding to a first one of a selected element of said pair of wildcarded resource identifiers and a second precedence value corresponding to a second one of a selected element of said pair of wildcarded resource identifiers, wherein said first precedence value and said second precedence value each comprise a predetermined value from said predetermined set of precedence values; and if said first precedence value and said second precedence value are not equal, ordering said pair of wildcarded resource identifiers according to said first precedence value and said second precedence.

26. The program product of claim 25 further comprising programming instructions performing the step of returning said pair of wildcarded resource identifiers from said ordering step to said predetermined sorting process.

27. The program product of claim 19 wherein said predetermined set of precedence values comprises:

a first precedence value having a highest precedence corresponding to an exact character, a second precedence value have a next lower precedence from said first precedence value, corresponding to a character range;

a third precedence value, having a next lower precedence from said second precedence value, corresponding to any character;

a fourth precedence value, having a next lower precedence from said third precedence value, corresponding to a repeating exact character;

a fifth precedence value, having a next lower precedence from said fourth precedence value, corresponding to a repeating character range; and a sixth precedence value, having a next lower precedence from said fifth precedence value; corresponding to any character string, and wherein said sixth precedence value comprises a lowest precedence value.

28. A security policy method comprising the steps of;

associating wildcarded resource identifiers with a corresponding security policy;

matching a resource identifier received in an access request to one of a list of said wildcarded resource identifiers, wherein said matching is determined in accordance with a predetermined set of precedence values, each precedence value of said predetermined set of precedence values corresponding to a predetermined wildcard element, wherein each predetermined wildcard element comprises a regular expression element; and selecting, in response to a security policy associated with a wildcarded resource identifier from said matching step, one of a grant of access to a requested resource corresponding to said resource identifier and a denial of access to said requested resource, and wherein said list of said wildcarded resource identifiers comprises an ordered list of wildcarded resource identifiers, said ordered list being ordered in accordance with said predetermined set of precedence values.

* * * * *